United States Patent [19]

Muramatsu

[11] Patent Number: 5,438,380
[45] Date of Patent: Aug. 1, 1995

[54] LENS-FITTED PHOTOGRAPHIC FILM UNIT AND PHOTOFINISHING METHOD USING THE SAME

[75] Inventor: Katsuji Muramatsu, Tokyo, Japan

[73] Assignee: Fuji Photo Film Co., Ltd., Kanagawa, Japan

[21] Appl. No.: 106,960

[22] Filed: Aug. 17, 1993

[30] Foreign Application Priority Data

Aug. 17, 1992 [JP] Japan .................. 4-217889
Aug. 20, 1992 [JP] Japan .................. 4-221622

[51] Int. Cl.$^6$ .............. G03B 17/24; G03B 17/02; G03B 11/00
[52] U.S. Cl. .................. 354/105; 354/288; 354/296
[58] Field of Search ............ 354/288, 296, 106, 94, 354/159, 105; 355/40, 41

[56] References Cited

U.S. PATENT DOCUMENTS

| | | | |
|---|---|---|---|
| 4,240,724 | 12/1980 | Johnson | 354/197 |
| 4,812,866 | 3/1989 | Ushiro et al. | 354/288 |
| 4,855,774 | 8/1989 | Ohmura et al. | 354/203 |
| 4,875,066 | 10/1989 | Rickard | 354/296 |
| 4,974,096 | 11/1990 | Wash | 358/302 |
| 5,086,311 | 2/1992 | Naka et al. | 354/195.1 |
| 5,128,711 | 7/1992 | Terashita et al. | 355/41 |
| 5,142,310 | 8/1992 | Taniguchi et al. | 354/106 |
| 5,151,726 | 9/1992 | Iwashita et al. | 354/75 |
| 5,181,057 | 1/1993 | Takagi et al. | 354/94 |
| 5,187,512 | 2/1993 | Kirkendall | 354/120 |
| 5,218,392 | 6/1993 | Sakamoto et al. | 354/106 |
| 5,223,871 | 6/1993 | Iwagaki et al. | 354/75 |

FOREIGN PATENT DOCUMENTS 56-132321 10/1981 Japan .
4298729 10/1992 Japan .

*Primary Examiner*—Michael L. Gellner
*Assistant Examiner*—Nicholas J. Tuccillo
*Attorney, Agent, or Firm*—Young & Thompson

[57] ABSTRACT

A lens-fitted photographic film unit is pre-loaded with unexposed photographic film, which is contained in a main body of the unit. A rear cover is secured to the main body to cover the rear of the film. An exposure aperture is formed in the main body in front of the film, and exposes the film so as to create an imaging frame, in a wide-vision aspect ratio in which a 35 mm full size is narrowed down widthwise. A single taking lens element focuses an image on the film, and has a focal length from 25 mm to 35 mm, a transverse chromatic aberration of at most 65 $\mu$, and a distortion of at most 0.9%. The aspect ratio of the imaging frame is 16/9. At least one train of ridges is formed on longer sides of the exposure aperture and is adapted to form marginal images outside the imaging frame by casting patterned shadows on the film.

4 Claims, 9 Drawing Sheets

LENS-FITTED PHOTOGRAPHIC FILM UNIT AND PHOTOFINISHING METHOD USING THE SAME

BACKGROUND OF THE INVENTION

1. Field of the Invention

The present invention relates to a lens-fitted photographic film unit and a photofinishing method using the same. More particularly, the present invention relates to a lens-fitted photographic film unit in which the aspect ratio of finished photographs is improved, and a photofinishing method using the same.

2. The Prior Art

Lens-fitted photographic film units (hereinafter referred to as film units) are now on the market, e.g. under the trademark "Fujicolor Quick Snap" (manufactured by Fuji Photo Film Co., Ltd.), which are a single-use camera pre-loaded with photographic film. Such film units make it possible to take photographs whenever desired without buying or carrying an expensive and heavy camera, and can take photographs of suitable quality in spite of their low cost. Such a lens-fitted film unit has a film housing incorporating a photographing mechanism for exposing the film contained therein, and is adapted to take photographs with the film by creating imaging frames of the 35 mm film size (24×36 mm, aspect ratio 1.50). There is another model "Fujicolor Quick Snap Panoramic" (trademark; manufactured by Fuji Photo Film Co., Ltd.), which is a panoramic film unit adapted to take photographs by creating imaging frames of a panoramic size (13×36 mm, aspect ratio 2.77).

Imaging frames of the 35 mm full size are frequently printed to obtain prints of a size of 89×129 min. When panoramic imaging frames are created by use of the film unit for panoramic photography, the imaging frames are printed to provide prints having a panoramic printing size of 89×254 mm, by enlarging the imaging frame in the corresponding printing magnification. A panoramic printing format is larger than a full size printing format, because the former is elongated in the horizontal direction but remains as wide vertically as the latter, and is advantageous as having a good appearance when finished.

However there is a problem with panoramic prints in that they have a rather great length, which causes difficulties and inconvenience when attempting to attach them to the pages of an album, or in other ways for preservation of the photographs.

OBJECTS OF THE INVENTION

In view of the foregoing problems, an object of the present invention is to provide a lens-fitted photographic film unit from which photographs can be obtained having an aspect ratio of good appearance, and photofinishing method using this film unit.

Another object of the present invention is to provide a lens-fitted photographic film unit from which photographs having an aspect ratio different from that of the 35 mm full size can be finished easily and unfailingly, and a photofinishing method using the same.

A further object of the present invention is to provide a lens-fitted photographic film unit capable of providing a photographic image reproduced with high quality.

Still another object of the present invention is to provide a lens-fitted photographic film unit in which a flare component of the light from a photographic object is prevented from being incident directly on an imaging frame of the film.

SUMMARY OF THE INVENTION

In order to achieve the above and other objects and advantages of this invention, a lens-fired photographic film unit is pre-loaded with unexposed photographic film, and has a main body which contains the film. A rear cover is secured to the main body to cover the rear of the film. An exposure aperture is formed in the main body in front of the film for exposing the film so as to create an imaging frame having an aspect ratio to which is narrowed widthwise of the film. Preferably, the aspect ratio of the imaging frame is 16/9. Therefore, photographs can be obtained with a format of good appearance.

A single taking lens element focuses an image on the film, and has a focal length from 25 mm to 35 mm, a transverse chromatic aberration of at most 65 $\mu$, and a distortion of at most 0.9%. A photographic image can be reproduced of high quality.

Furthermore, a patterned portion is formed e.g. by ridges on at least one longer side of the exposure aperture. The projected patterned portion casts a correspondingly patterned shadow on the film outside the imaging frame. Therefore the wide-vision imaging frame cannot be mistaken for a full size frame, and can be detected unfailingly as such. Although the adopted format is different from the 35 mm full size, photographs can be finished easily and unfailingly. The flare component of the light from a photographic object is reflected on the lateral faces of the ridges and is attenuated by them. Therefore the flare light is prevented from being incident directly on an imaging frame.

The wide-vision frames as created on the film according to the present invention thus can be printed by a method of producing wide-vision prints having a format of 89×158 mm, which is the same as, and as highly agreeable as, the format of a high-definition television system. This has an advantage of facility and convenience in attachment to pages of an album, even when wide-vision prints are arranged with full size prints, or in other ways for preservation of the photographs.

It could be conceived according to the wide-vision printing method to utilize the full size imaging frames to produce wide-vision prints, by trimming off the upper and lower horizontal portions of the frames of the full size while printing. To do this, a user, having placed an order for photofinishing with an agent, would receive and view the developed film as returned from the agent. Frames as desired would be selected from among the frames on the film, to avoid frames with significant partial images crossing a virtual pair of horizontal lines defining the top and bottom of the wide-vision frame. To produce wide-vision prints from the selected full size frame, an order for extra printing would be placed with the photofinishing agent, in accordance with an instruction of the user or customer designating the frames selected.

The above steps of the wide-vision printing method utilizing full size frames have many problems such as excessive labor, long finishing time, and high expense. By contrast, the present invention is favorable as compared with the above method, because no laborious step is needed for selection of frames, designation of frames, and the photofinisher's closest attention to the operation of extra printing at the specified wide-vision format.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
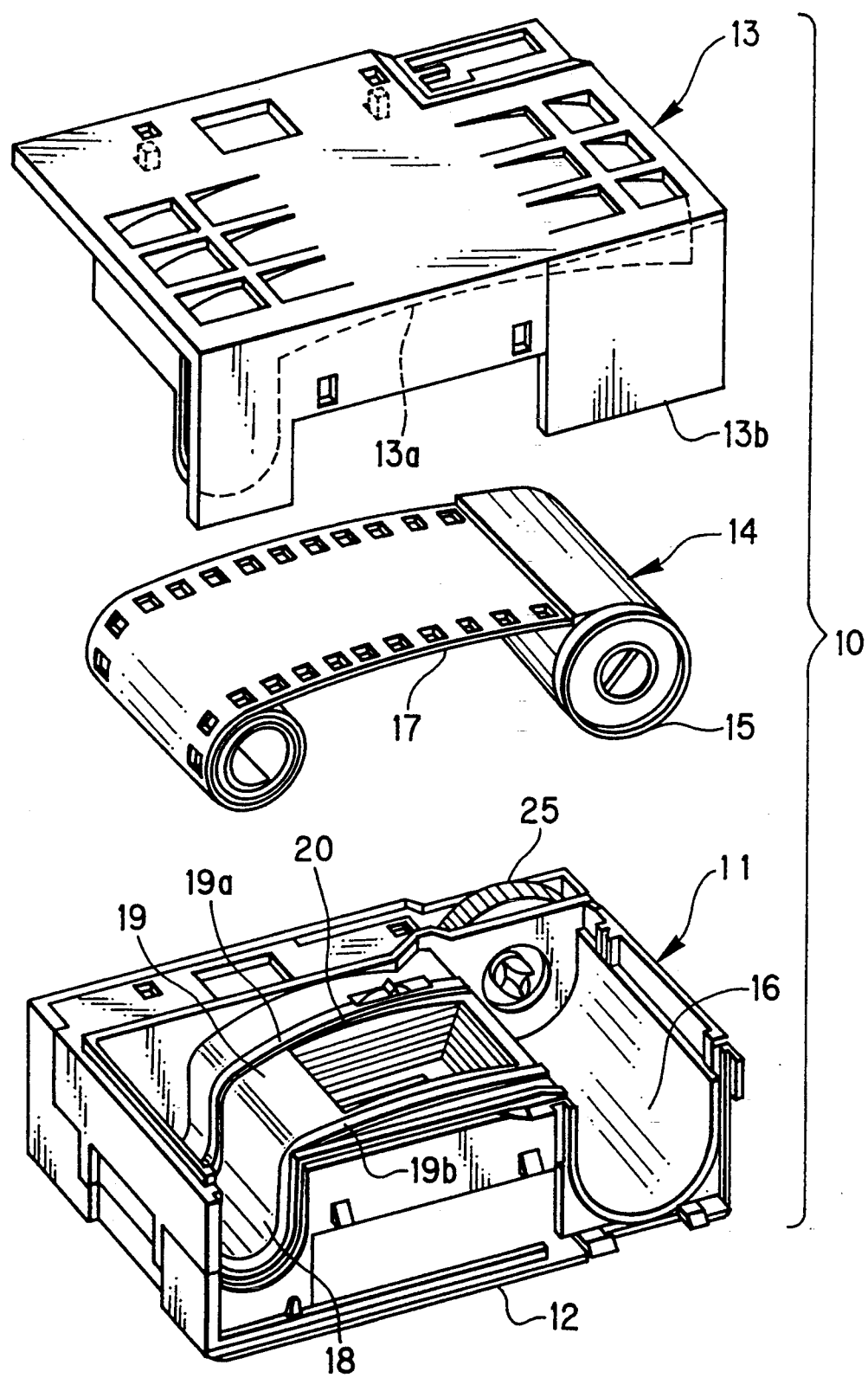
FIG. 1 is an exploded perspective view illustrating a novel lens-fitted photographic film unit according to the present invention.

In FIG. 1 illustrating a film housing 10 of a novel lens-fitted film unit according to the present invention, a main body 11 is provided with a front cover 12 and a rear cover 13, and has a taking lens 22 (see FIG. 2), a shutter mechanism and other relevant mechanisms for taking photographs. The main body 11 is provided with a cassette chamber 16 and a film roll chamber 18. The cassette chamber 16 contains a cassette shell 15 of a photographic film cassette 14. The film roll chamber 18 receives and contains photographic film 17 in the form of a roll that is formed when the film 17 is drawn out of the cassette shell 15.

Figure 2:
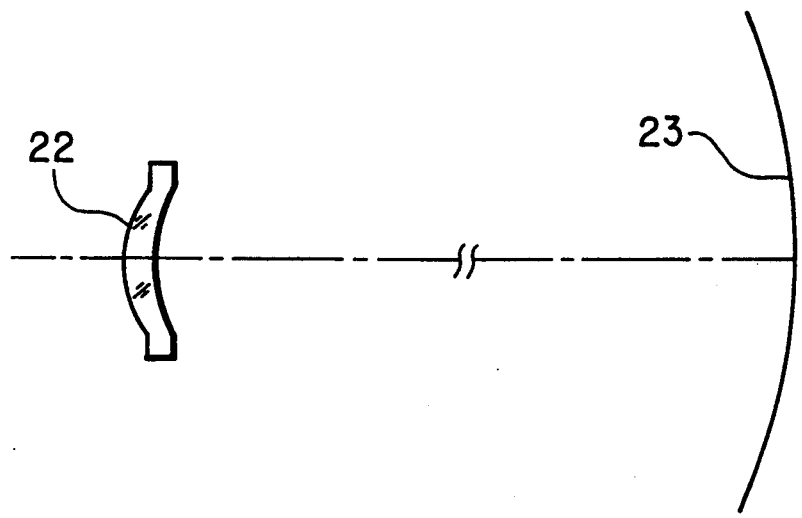
FIG. 2 is an explanatory view illustrating the focal plane of a taking lens.

Between the chambers 16 and 18 is formed an exposure tube 19, of which a rear portion surrounds an exposure aperture 20 that defines the area to be exposed on the film 17. There are arranged a pair of horizontal film rails 19a and 19b respectively above and below the exposure aperture 20, which are rearwardly convex in order to position the film 17 in the correspondingly curved focal plane of the taking lens 22. As is illustrated in FIG. 2, the taking lens 22 is constituted of a spherical single lens element formed of plastic material.

The rear cover 13 is provided with a pressure plate portion 13a curved in a concave shape adapted to mate with the convex shape of the film rails 19a and 19b. The rear cover 13 is provided with a bottom lid 13b that can swing open. After the use of the film cassette 14, the bottom lid 13b is accessible to a photofinishing operator, in order to open the cassette chamber 16 to remove the cassette 14 from it. Note that the film housing 10 as completed is covered by a packaging of paper or cardboard (not shown) to constitute the lens-fitted film unit for sale and use.

Figure 3:
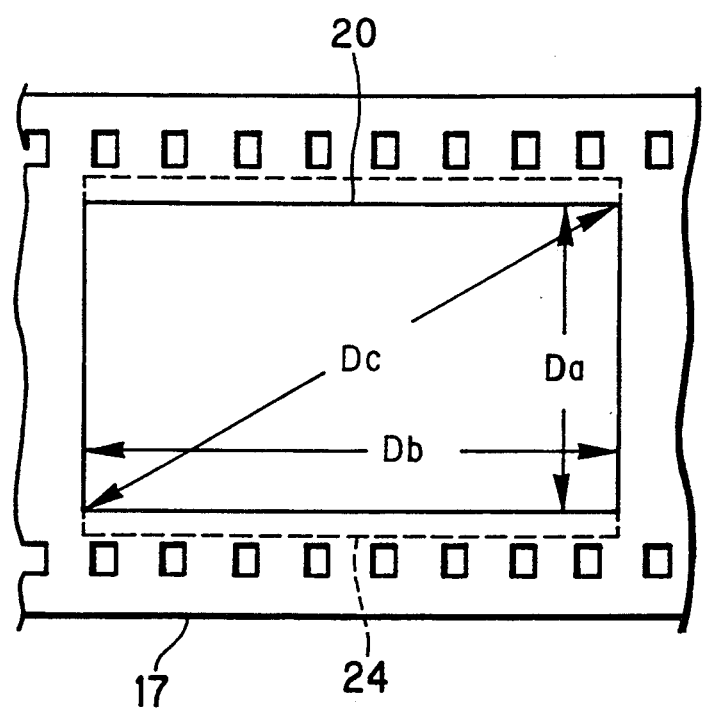
FIG. 3 is an explanatory view illustrating the relationship in size between an imaging frame of an exposure aperture according to the invention, and an imaging frame of full or normal size.

In FIG. 3 illustrating the film 17 and the exposure aperture 20, the exposure aperture 20 has a format of $Da \times Db$, which is adapted to the wide-vision format of photographic printing, and is formed by narrowing a normal or full-size frame 24 of the 35 mm size ($24 \times 36$ mm, of which the aspect ratio 1.5 corresponds effectively to a printing aspect ratio of 1.43 of a photographic print $89 \times 127$ mm in size) as indicated by the broken line. Da is 20.5 mm, and that Db is 36 mm. The aspect ratio of 1.76 of the exposure aperture 20 corresponds effectively to the printing aspect ratio of 1.78 or 16/9 of a wide-vision photographic print $89 \times 158$ mm in size, which is the same as the aspect ratio of a high-definition television system. This is an aesthetically agreeable aspect ratio, as it corresponds to the field of view visible to human eyes in general.

Figure 4:
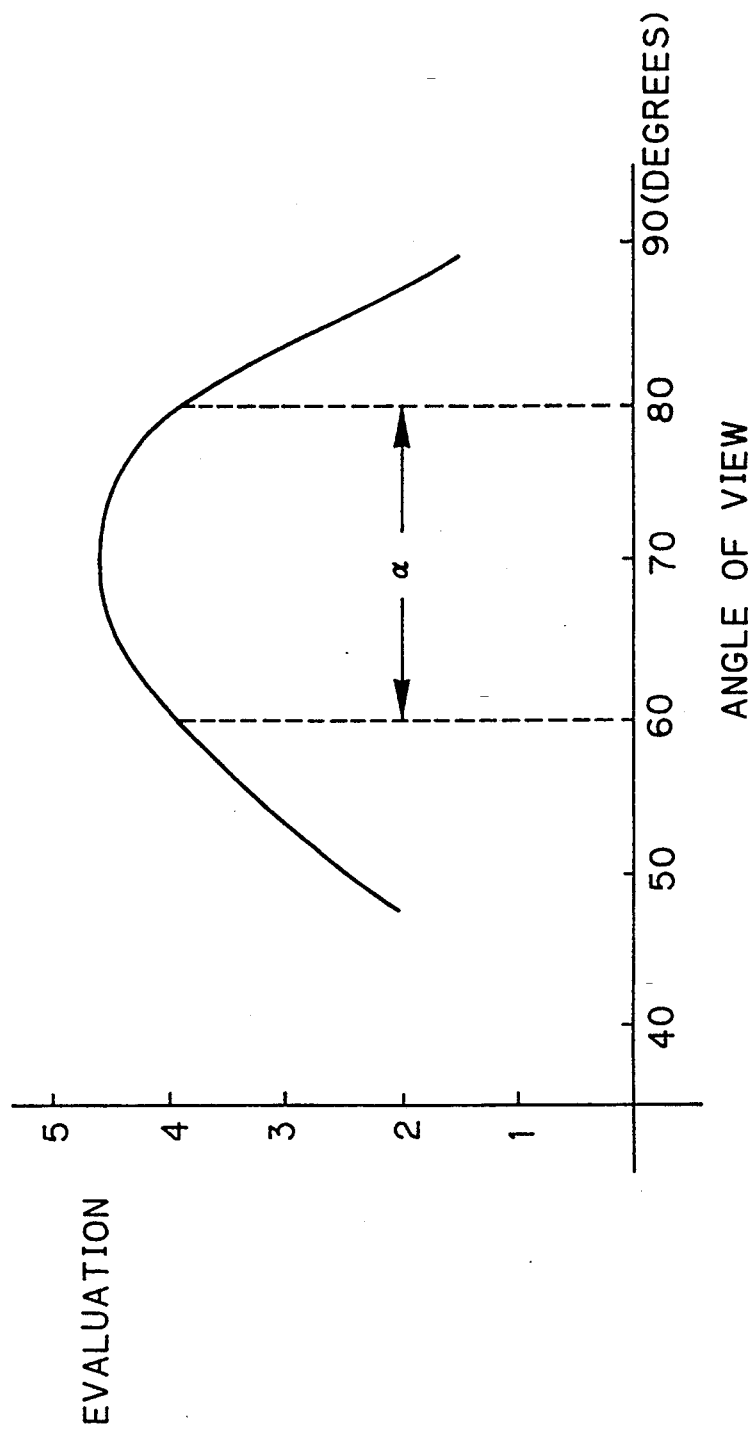
FIG. 4 is a graph illustrating the evaluation of the appearance of wide-vision prints while varying the angle of view of the taking lens.

The exposure aperture 20 has a diagonal length Dc of 41.43 mm, to which the angle of view of the taking lens 22 corresponds. Experiments were conducted for determining the taking lens producing a good appearance of the photograph as printed, in consideration of the diagonal length Dc of the exposure aperture 20. To evaluate this good appearance, various samples of taking lenses were prepared, which differed as to the angle of view. Photographs were taken by use of the various sample lenses. The negative film as exposed was processed and printed to obtain photographs of the wide-vision format. The evaluation of the good appearance of the wide-vision photographs is illustrated in FIG. 4. As will be understood from this figure, the angle of view $\alpha$ in the range from 60° to 80° is preferable. Because the focal length FL corresponding to the angle of view $\alpha$ meets the condition:

$$\alpha = 2 \arctan(Dc/2FL)$$

the preferable range of F is obtained according to the relationship:

$$FL = Dc/\{2 \tan(\alpha/2)\}$$

as:

$$25 \leq FL \leq 35$$

Therefore the focal length of the taking lens appropriate for the wide-vision lens-fitted film unit is in the range of 25 to 35 mm.

In FIG. 4, if the angle of view is greater than 80°, the photographs are evaluated as being of low quality because the images as photographed are conspicuously distorted on the photographs. If the angle of view is less than 60°, the corresponding samples of the lens have a longer focal length causing a somewhat shorter depth of focus, which may be inappropriate for and inconsistent with a general-purpose film unit of fixed focus, because various different objects as desired could not be taken all in focus. The novel film unit of this invention has advantages overcoming those drawbacks, and is further advantageous by having an angle of view of 60 or more degrees because the dimensional thickness of the film unit is prevented from being greater than necessary.

Figure 5:
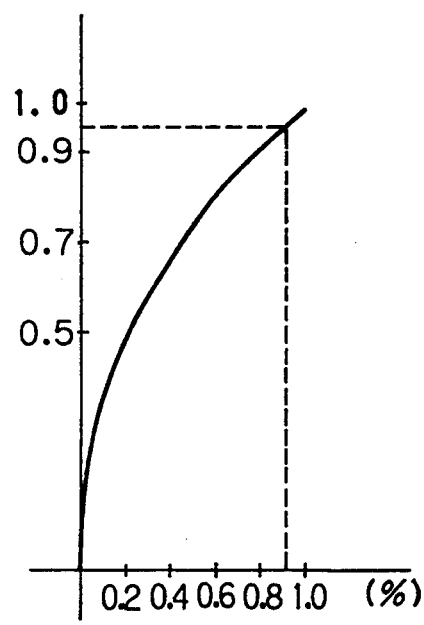
FIG. 5 is a graph illustrating distortion of the taking lens.

FIG. 5 illustrates distortion as a characteristic of the taking lens 22. This relationship is obtained by photographing a straight line included in a photographic object through the taking lens 22, and by measuring the extent of curvature of the image recorded on the film 17. The distortion is measured by the TV method. It is preferable for the taking lens 22 to have a distortion of at most 0.9%. The ordinate of FIG. 5 is the position lying on a diagonal line of a frame with reference to the optical axis. "1.0" represents a full field of the 35 mm full size format, which is the longest diagonal line of all possible frames. "0.9" represents a position having a distance 0.9 times as long from the optical axis as the distance of the full field. In the wide-vision format, the diagonal is approximately 0.95 times as long as the diagonal of the full size format.

Figure 6:
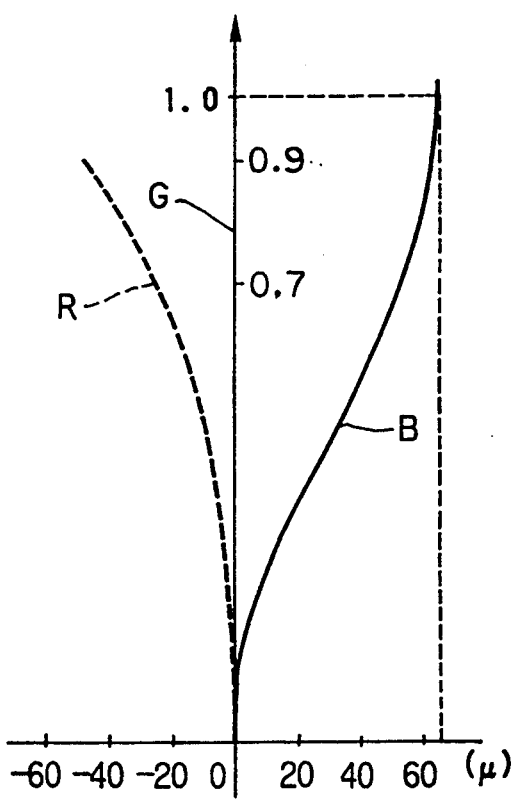
FIG. 6 is a graph illustrating transverse chromatic aberration of the taking lens.

FIG. 6 illustrates transverse chromatic aberration as a characteristic of the taking lens 22. Transverse chromatic aberration is defined as the displacement from the vertical (corresponding to the optical axis and also to the Green), between colors of light passing through the lens. Transverse aberration causes such deviation between colors that the Blue is focussed while being shifted toward the edges of the frame, and the Red is focussed while being shifted toward the center of the frame. The relationship shown is obtained by measuring the differences of positions where the Red, Green and Blue are incident on a marginal area of the frame. Note that it is preferable for the taking lens 22 to have a transverse chromatic aberration of only at most 65 $\mu$ for Red or Blue.

The operation of the novel film unit will now be described. When a user purchases the film unit, he or she rotates a film winding wheel 25 until the wheel 25 cannot further rotate. A first imaging frame is thus positioned in registry with the exposure aperture 20. The shutter mechanism is charged. The camera is directed toward a desired object. A shutter release button is depressed. The shutter mechanism in the main body 11 is driven so as to expose the film 17 through the aperture 20 to light to record the object image.

Alternate operation of the wheel 25 and the release button is continued, until the film 17 is exposed to create frames up to the maximum photographable number. Thereafter, the wheel 25 is rotated continuously so as to wind up all the remainder of the film 17 into the cassette shell 15. The user then brings the used film unit to a photofinishing agent and places an order for photofinishing. The agent forwards the film unit to a photo laboratory. The paper or cardboard packaging is partly removed to expose at least the bottom lid 13a covering the cassette chamber 16. Then the lid is opened, and the film cassette 14 is removed from the film housing 10. The film cassette 14 is positioned in an automatic developing apparatus for development of the film 17. A printer section incorporated in a photographic printer-processor is set to the wide-vision mode. The negative film 17 is introduced into the printer-processor. In the wide-vision mode, the printer-processor is controlled so as to adjusting the printing lens to a magnification appropriate for printing and to change a mask into the wide-vision format or 89×158 mm. Color photographic paper is exposed to record the object image, and is developed by a processor section in the printer-processor, so as to produce finished wide-vision photographs of magnificent appearance.

In the above embodiment, the taking lens 22 is constituted by the spherical plastic single element. This is advantageous because of low cost of manufacture. Alternatively, a taking lens may be constituted by an aspherical single element, which is advantageous because spherical aberration can be cancelled. Also, the taking lens may be formed from optical glass.

Figure 7:
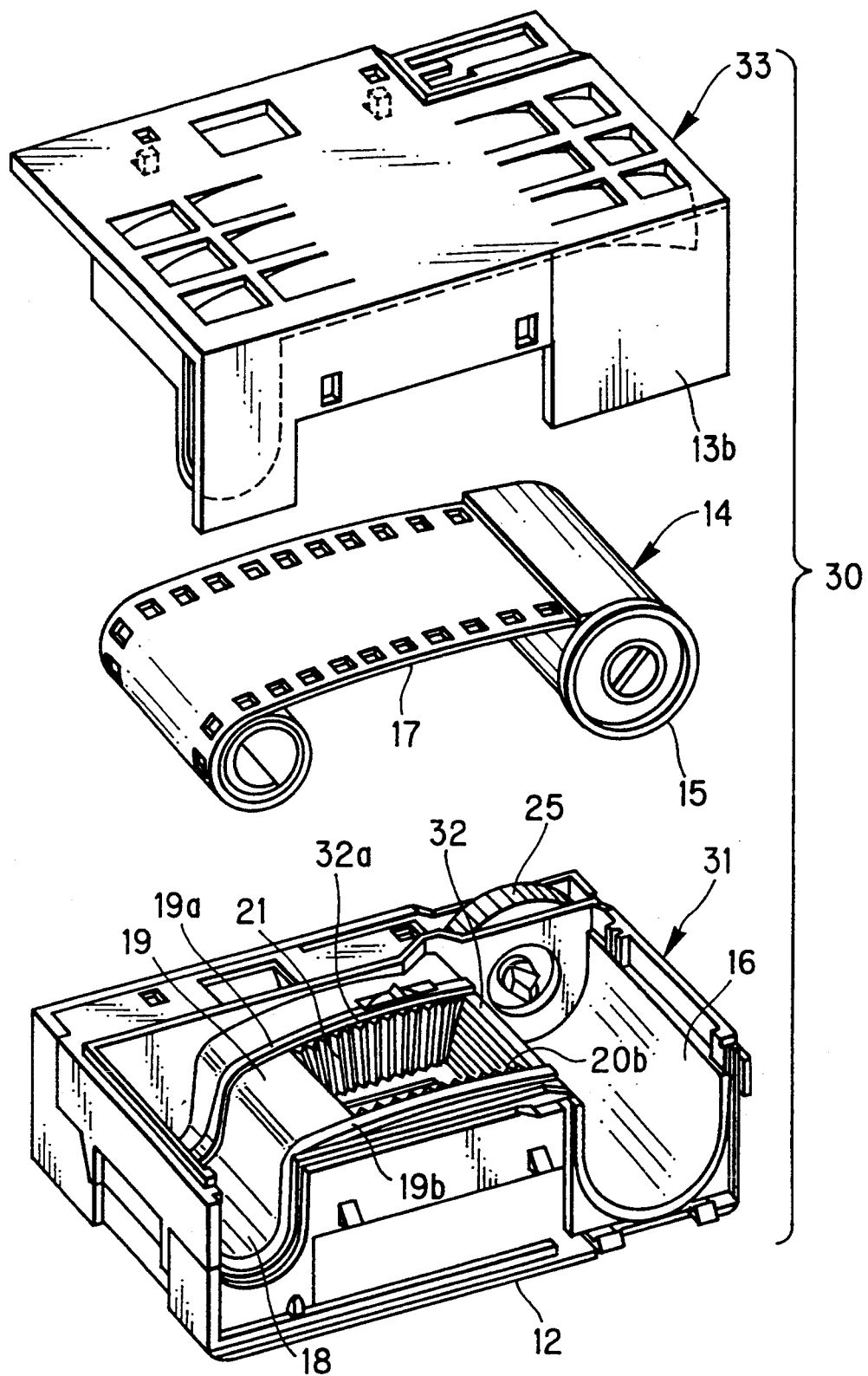
FIG. 7 is an exploded perspective view illustrating another preferred embodiment of a film unit according to the present invention.
Figure 8:
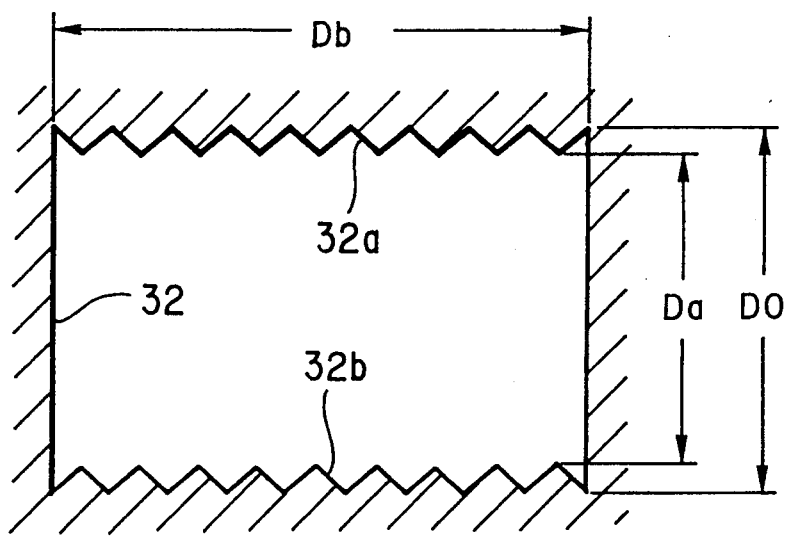
FIG. 8 is an explanatory view illustrating one embodiment of the exposure aperture.

In the above embodiment, an operator in the photofinishing laboratory visually detects the negative film containing the wide-vision frames. There is a high probability of error in such visual detection of the frame size, which would cause an error in selecting the printing mode. FIGS. 7 and 8 illustrate a second embodiment to solve this problem. Elements similar to those in the first embodiment are designated with identical reference numerals. An exposure aperture 32 is provided with two trains 32a and 32b of tapered ridges 21, arranged along opposite horizontal longer sides of the exposure aperture 32 and extending front to rear on the inside of the exposure tube 19. The ridge trains 32a and 32b have a height of (D0−Da) /2, based on a virtual aperture of the 35 mm full size format DO×Db with an aspect ratio of 1.5. The trains of the tapered tops of the ridges 21 constitute the longer sides of the wide-vision exposure aperture 32, and are spaced at the interval Da as described above. Note that the shorter side of the 35 mm full size format is DO=24 mm long.

When the light from the object enters the exposure tube 19 from the taking lens 22, flare components of the light are reflected by the lateral faces of the ridges 21 and attenuated by them. Therefore the flare is prevented from being incident directly on an imaging frame 34 (see FIG. 9). The shape of the ridge trains 32a and 32b is also favorable because they can be formed by the use of inexpensive molds.

Figure 9:
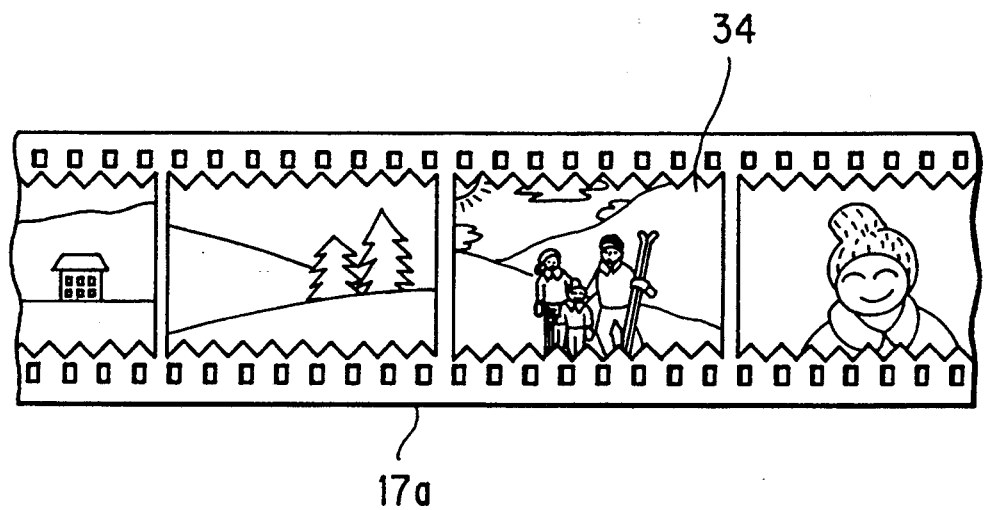
FIG. 9 is a plan view illustrating a negative film exposed in the film unit of FIG. 7.
Figure 10:
FIG. 10 is a plan view illustrating a wide-vision print finished from the negative film of FIG. 9.

A negative film 17a as developed is provided with the imaging frames 34 as illustrated in FIG. 9. After the film 17a is developed, the saw-like horizontal edges of the frames can cause the photofinisher to distinguish easily the imaging frames 34 recorded with the intention of wide-vision printing thereof. Despite the saw-like edges, the photograph after printing of the wide-vision frame is provided with straight horizontal edges from which the saw teeth have been cut off, as illustrated in FIG. 10.

Figure 11:
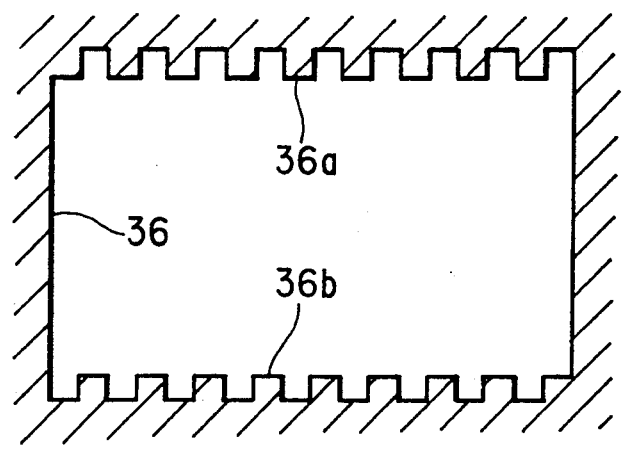
FIG. 11 is an explanatory view illustrating another embodiment of exposure aperture having trains of ridges with rectangular tops.
Figure 12:
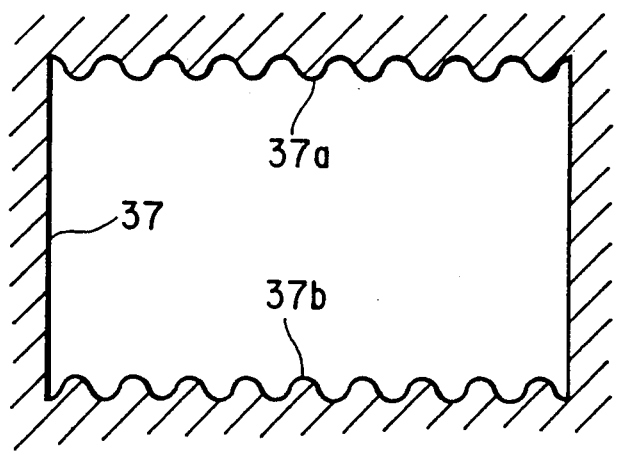
FIG. 12 is an explanatory view illustrating still another exposure aperture having trains of ridges with round tops.
Figure 13:
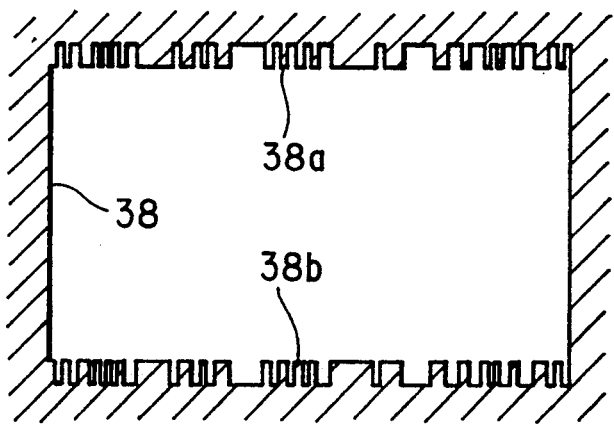
FIG. 13 is an explanatory view illustrating a further exposure aperture having trains of ridges for forming a bar code.

FIGS. 11 to 13 illustrate other preferred configurations of edges of the exposure apertures 36 to 38. In FIG. 11, an exposure aperture 36 has two trains 36a and 36b of ridges whose shape as viewed in section is rectangular. In FIG. 12, an exposure aperture 37 has two trains 37a and 37b of ridges whose shape as viewed in section is round. In FIG. 13, an exposure aperture 38 has two trains 38a and 38b of ridges arranged as a bar code, as viewed in section. The trains 38a and 38b are mirror images of each other.

Figure 14:
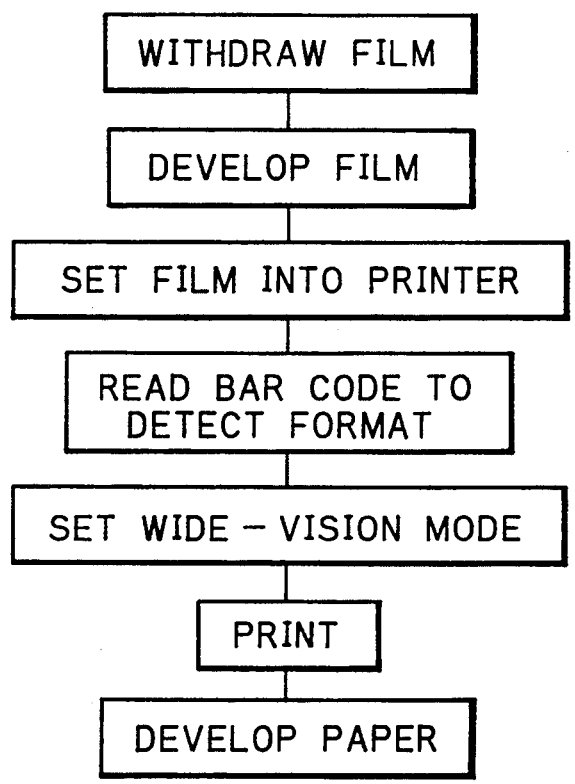
FIG. 14 is a flow chart illustrating a novel system in which a bar code is formed while the film is exposed, and is detected when the frame is printed.

Upon taking a photograph, exposure aperture 38 exposes the film with the object light masked by the bar code. The printer or printer-processor, adapted to print the negative film 17a as exposed with the novel exposure aperture 38, is provided with one or two sensors for detecting the one or two bar codes imposed by the ridge trains 38a and 38b. As is illustrated in the flow chart in FIG. 14, when the negative film 17a is set into the printer, the sensor first reads the bar code, and detects that the imaging frame should be printed according to wide-vision printing. In response to the output of the sensor, the printer section of the printer-processor is changed over to the wide-vision printing mode automatically. Note that detection of the wide-vision designation can be also utilized for controlling the printer by a forced stop, while inhibiting the printer from printing in a full-size printing mode.

Note that a train of ridges can instead be formed on only one longer horizontal side of an exposure aperture according to the present invention. However, it is still desirable to form the two trains of the ridges on both opposite longer sides of the exposure aperture. This is advantageous particularly in the case of an image frame whose image is dark along either of the longer sides. Should there be ridges formed on only one longer side, the image which his dark on the side opposite the ridges might not be correctly judged to be of wide-vision format or full size. Therefore, ridge trains along both longer sides are advantageous because the image frame dark along only one longer side can then be unfailingly detected as being of wide-vision format.

It is also to be noted that Da, that is, the length of the shorter side of the wide-vision aperture, is 20.5 mm, but can have another proximate value, e.g. 20 mm, which corresponds to the ratio 16/9 when the longer side Db is 36 mm.

The above embodiments are directed to film units of wide-vision format. Alternatively, the arrangement of the two trains of the ridges on the exposure aperture and the formation of the taking lens with small aberration is applicable to a lens-fitted film unit of a narrowed exposure aperture of a different format, e.g. a film unit of the panoramic format.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A method of producing a photograph from photographic film exposed by use of a lens-fitted photographic film unit, said film unit having an exposure aperture for exposing said film so as to create an exposed area on said film, said method comprising the steps of:

providing a patterned portion on at least one longer side of said exposure aperture, said patterned portion including projections that extend into said exposure aperture and that cast a patterned shadow on said film to create a patterned edge on said exposure area;

developing said film;

reading information conveyed by said patterned edge so as to determine an aspect ratio at which the film is to be printed;

setting a printer in a printing mode adapted to print said film at said aspect ratio; and producing said photograph from said film in said adapted printing mode.

2. A photofinishing method as defined in claim 1, and printing said photograph without said patterned shadow thereon.

3. A photofinishing method as defined in claim 1, wherein said aspect ratio is substantially 16/9.

4. A photofinishing method as defined in claim 1, wherein said projections are arranged in a bar code.

* * * * *